United States Patent
Bennis

(10) Patent No.: US 11,673,498 B2
(45) Date of Patent: Jun. 13, 2023

(54) VEHICLE SEAT WITH VIBRATION DEVICE

(71) Applicant: FAURECIA Sièges d'Automobile, Nanterre (FR)

(72) Inventor: Sophia Bennis, Paris (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/360,386

(22) Filed: Jun. 28, 2021

(65) Prior Publication Data

US 2022/0410779 A1   Dec. 29, 2022

(51) Int. Cl.
*B60N 2/90* (2018.01)

(52) U.S. Cl.
CPC ........ *B60N 2/976* (2018.02); *B60N 2002/981* (2018.02)

(58) Field of Classification Search
CPC ..... B60N 3/00; B60N 2/976; B60N 2002/981
USPC ...................................... 297/214.4
See application file for complete search history.

(56) References Cited

U.S. PATENT DOCUMENTS

| | | | |
|---|---|---|---|
| 5,314,403 A * | 5/1994 | Shaw | A61H 23/0236 601/55 |
| 5,875,255 A * | 2/1999 | Campbell | H04R 1/2819 381/345 |
| 7,050,593 B1 | 5/2006 | Emerling | |
| 2001/0031052 A1 | 10/2001 | Lock | |
| 2002/0090106 A1 * | 7/2002 | Guenther | H04R 9/02 381/412 |
| 2010/0036297 A1 | 2/2010 | Kim | |
| 2014/0008948 A1 | 1/2014 | Rockwell | |
| 2014/0219492 A1 * | 8/2014 | Pelliccio | H04R 5/023 381/389 |
| 2016/0323674 A1 * | 11/2016 | Porter | H04R 31/006 |

FOREIGN PATENT DOCUMENTS

| | | |
|---|---|---|
| DE | 102019122187 A1 | 2/2021 |
| DE | 102019132248 A1 | 6/2021 |
| JP | 2002354567 A * | 12/2002 |
| JP | 2011229754 A * | 11/2011 |

OTHER PUBLICATIONS

German Search Report for German App. No. DE 10 2021 116 743.4 dated Jun. 8, 2022, 11 pages.
French Preliminary Search Report for French App. No. FR2000026 dated Jun. 26, 2020, No English Translation Availabile, 8 pages.

* cited by examiner

*Primary Examiner* — Milton Nelson, Jr.
(74) *Attorney, Agent, or Firm* — Barnes & Thornburg LLP

(57) ABSTRACT

A vehicle seat comprises at least one vibration device comprising an electroacoustic transducer, the vibration device having a mass less than or equal to 130 g.

9 Claims, 2 Drawing Sheets

VEHICLE SEAT WITH VIBRATION DEVICE

BACKGROUND

The present disclosure relates to a vehicle seat comprising a vibration device.

SUMMARY

According to the present disclosure, a vehicle seat comprises at least one vibration device comprising an electroacoustic transducer, the vibration device having a mass less than or equal to 130 g.

In illustrative embodiments, the mass of the vehicle seat comprising such a vibration device is reduced.

In illustrative embodiments, the electroacoustic transducer comprises a permanent magnet, the permanent magnet being made of neodymium. Such a permanent magnet has the advantage of being lightweight.

In illustrative embodiments, the electroacoustic transducer comprises a coil, the permanent magnet being at least partially received inside the coil, the coil and the permanent magnet together producing a magnetic field greater than 2.5 T.

In illustrative embodiments, such a magnetic field increases the excursion of the permanent magnet, thus generating more force to be transmitted to the occupant of the seat.

In illustrative embodiments, a displacement of the permanent magnet due to the magnetic field produces a force greater than 3 N. Such a force provides that an occupant of the vehicle seat sufficiently perceives the vibrations produced by the vibration device.

In illustrative embodiments, the electroacoustic transducer comprises a housing and a permanent magnet, the permanent magnet being movably connected to the housing by at least one suspension, the suspension having a stiffness greater than 5,000 N·m$^{-1}$. In particular, the stiffness is greater than 9,000 N·m$^{-1}$.

In illustrative embodiments, a vibration device having a stiffness and mass as described above allows oscillation of the magnet in a low frequency range to ensure tactile stimulation of the seat occupant. Also, such stiffness of the suspension allows rapid excursion of the permanent magnet. This gives the user the sensation of a vigorous pulse.

In illustrative embodiments, the electroacoustic transducer has a resonant frequency of less than 50 Hz. Such a resonant frequency of the vibration device makes it possible to produce vibrations over a bandwidth of between 20 Hz and 130 Hz. The term "bandwidth" is understood here to mean a frequency range for which the vibrations produce sufficient force to be perceived by the seat occupant.

According to another aspect, the vehicle seat as described above comprises a seating portion and a backrest, the vibration device being located in the seating portion or in the backrest.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 1:
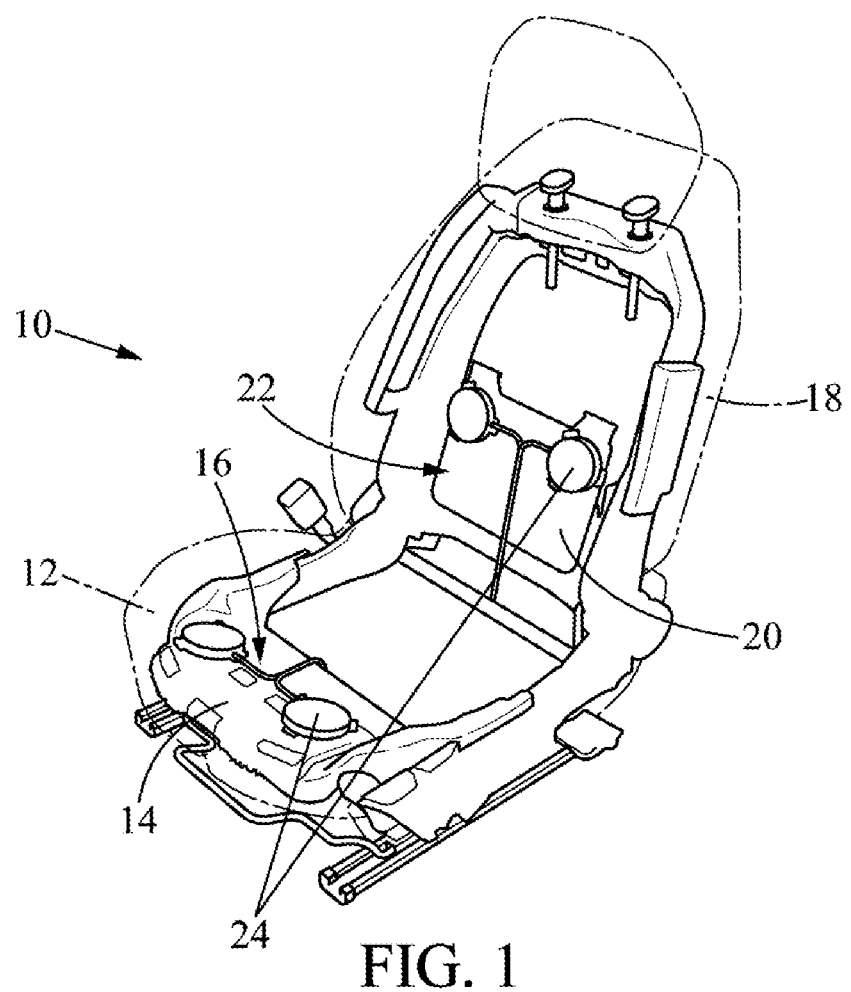
Figure 2:
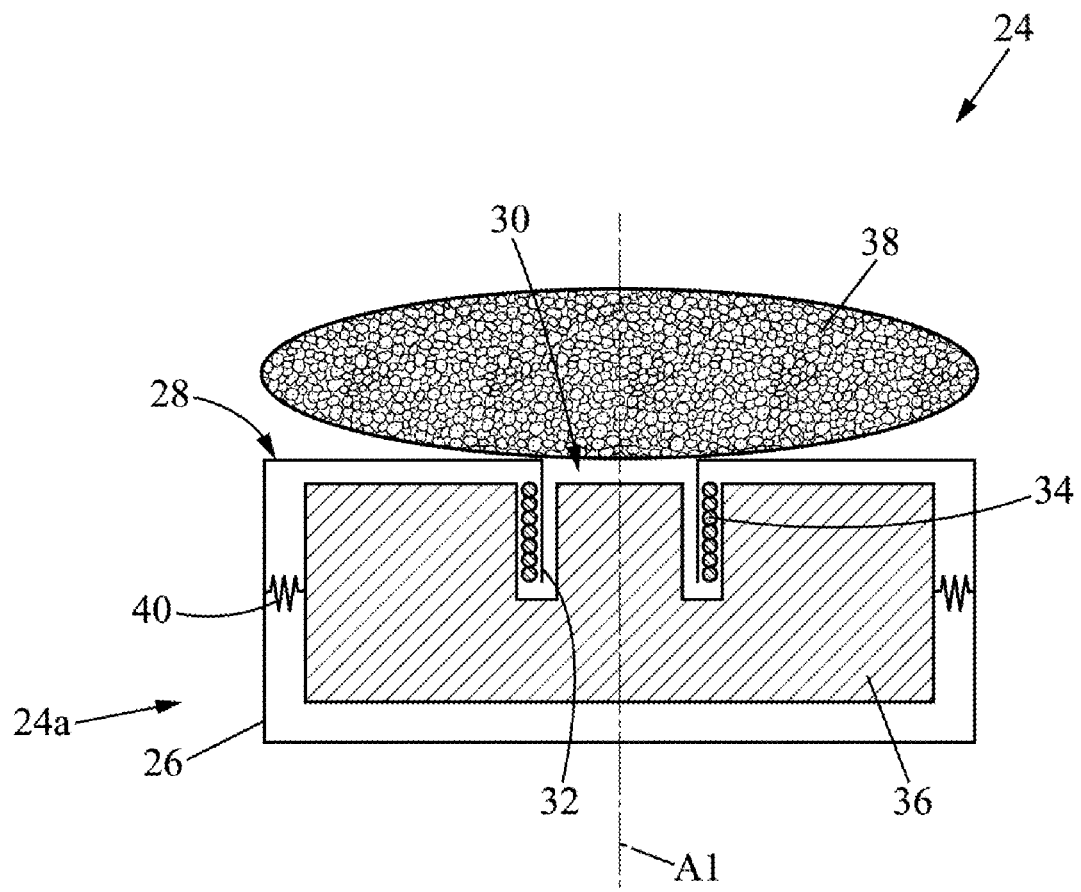

The detailed description particularly refers to the accompanying figures in which:

FIG. 1 represents a perspective view of a seat according to the present disclosure;

FIG. 2 schematically represents a vibration device for the seat of FIG. 1; and

Figure 3:
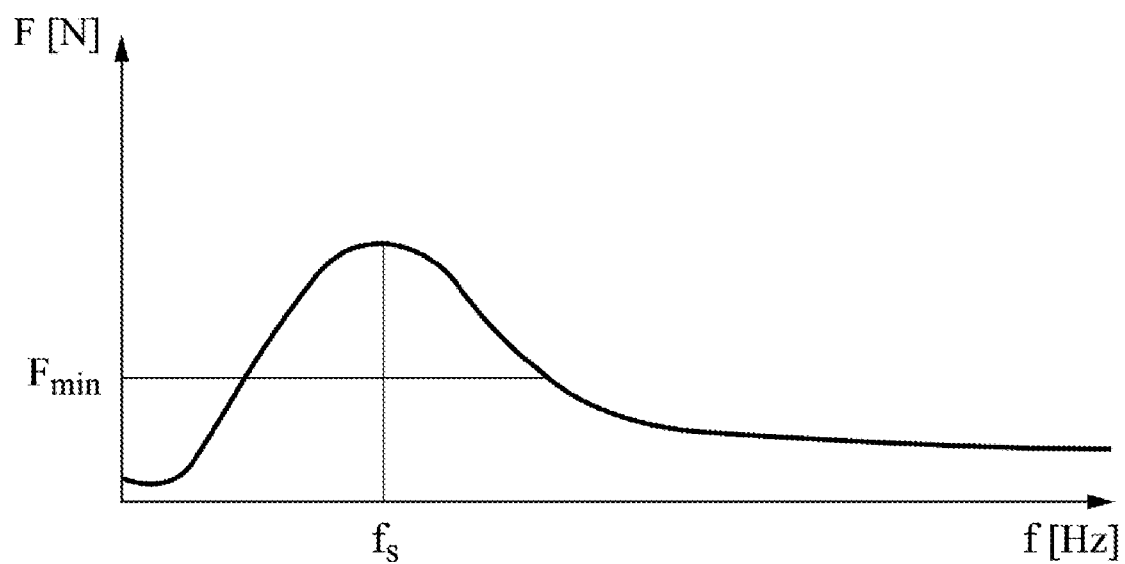

FIG. 3 represents the operating frequency domain of the vibration device of FIG. 2.

DETAILED DESCRIPTION

The drawings and the description below contain, for the most part, elements that are certain in nature. They therefore can serve not only to provide a better understanding of this disclosure, but where appropriate also contribute to its definition.

FIG. 1 shows a perspective view of a vehicle seat 10, in particular a motor vehicle seat 10. The vehicle seat 10 has a seating portion 12 with a seating portion frame 14. The seating portion 12 has an upper face 16. The seat 10 also comprises a backrest 18 with a backrest frame 20. The backrest 18 has a front face 22. The upper face 16 and the front face 22 are intended to be in contact respectively with the buttocks/legs and the back of an occupant seated on the seat 10.

The seat 10 comprises one or more vibration devices 24 which are integrated into the seating portion 12 and/or the backrest 18 of the seat. In particular, one or more vibration devices 24 are attached to the seating portion frame 14 and/or to the backrest frame 20 of the seat.

An example of a vibration device 24 is shown in FIG. 2. The vibration device 24 comprises an electroacoustic transducer 24a.

The electroacoustic transducer 24a comprises a housing 26 fixed to the seating portion frame 14 or to the backrest frame 20 of the seat. The housing 26 here has for example a circular cross-section as can be seen in FIG. 1. An upper wall 28 of the housing 26 has a central opening 30. The term "upper wall" is understood here to mean the wall of the housing 26 intended to be opposite, or facing, the buttocks/legs or back of an occupant seated on the seat 10. The housing 26 also comprises a support 32 extending inwardly into the housing 26 from the upper wall 28. The support 32 enables winding a coil 34 of the electroacoustic transducer 24a around a first axis A1.

The electroacoustic transducer 24a further comprises a permanent magnet 36 arranged to be movable inside the housing 26. The permanent magnet 36 is further arranged at least partially inside the coil 34 of the vibration device 24. The permanent magnet 36 can thus be moved in one direction or the other along the direction of the first axis A1, by the interaction between a magnetic field formed by the permanent magnet 36 and a magnetic field formed by the coil 34 when the latter is supplied with electric current.

The permanent magnet 36 is moved so that an excursion of a portion of the permanent magnet 36 through the central opening 30 generates force on a foam 38 arranged on the upper wall 28 of the housing 26. The force is then transmitted to the occupant of the seat 10 via the foam 38 and possibly via a padding of the seat 12 or of the backrest 18. Repeated displacement of the permanent magnet 36 thus produces vibrations transmitted to the occupant of the seat 10.

The permanent magnet 36 is connected to the housing 26 by suspensions 40. Each suspension 40 exerts a return force against the displacement of the permanent magnet 36. The suspensions 40 also allow centering the permanent magnet 34 within the housing 26. Each suspension 40 has a stiffness greater than 5,000 N·m$^{-1}$, for example, greater than 9,000 N·m$^{-1}$, in particular about 10,000 N·m$^{-1}$. Such stiffness of the suspensions 40 allows a rapid excursion of the permanent magnet 36, promoting the sensation of a vigorous pulse by the occupant of the seat 10.

The electroacoustic transducer 24a as described has a mass of less than 130 g. There is thus little effect by such vibration devices 24 on the mass of the vehicle seat 10.

The permanent magnet 36 may be made of neodymium. Neodymium is a magnetic material with the advantage of being lightweight, in particular lighter than ferrite which is frequently used.

FIG. 3 shows the force produced by the electroacoustic transducer 24a when the frequency of the applied force varies. One will note that the force generated by the electroacoustic transducer 24a is maximal when applied at its resonant frequency fs. Furthermore, the power of the electroacoustic transducer 24a is maximal at the resonant frequency fs. In other words, the efficiency of the electroacoustic transducer 24a is maximal at the resonant frequency fs. Moreover, there is a frequency range around the resonant frequency fs, called the bandwidth, for which the electroacoustic transducer 24a has sufficient efficiency to produce vibrations perceived by the occupant of the seat 10.

Due to the mass of the vibration device 24 and the stiffness of the suspensions 40 as described above, the electroacoustic transducer 24a here has a resonant frequency fs of less than 50 Hz, less than 45 Hz, or less than 40 Hz. Such a resonant frequency of the vibration device makes it possible to produce vibrations having sufficient force to be felt starting at 20 Hz. In particular, such a resonant frequency makes it possible to obtain a bandwidth of between 20 Hz and 130 Hz. Vibrations included in such a frequency domain are particularly suitable for the transmission of vibrations to the occupant of the seat 10.

Furthermore, the permanent magnet 36 and the coil 34 produce a magnetic field greater than 2.5 T. Such a magnetic field allows significant excursion of the permanent magnet 36. The force generated by the vibration device 24 here is thus greater than a minimum perceptible force threshold $F_{min}$ for the occupant over the entire bandwidth, ranging here from 20 Hz to 130 Hz. The term "minimum perceptible force threshold $F_{min}$" is understood to mean the minimum force needed for the occupant of the seat 10 to perceive the vibrations produced by the vibration device. The minimum perceptible force threshold $F_{min}$ here is equal to 3 N.

Comparative vehicle seats may have built-in vibration devices for transmitting vibrations to the occupant seated in the seat. These vibrations are generally generated by a vibration device comprising an electroacoustic transducer. The transmission of these vibrations to the occupant can have a variety of purposes, such as occupant comfort or warning the occupant of a hazard outside the vehicle.

However, such comparative vibration devices have the disadvantage of being heavy and bulky.

In contrast, there are other comparative vibration devices comprising an eccentric motor which are lighter. However, such devices do not have a sufficiently low resonant frequency to transmit produced low frequency vibrations to the seat occupant in a sufficiently perceptible manner.

This disclosure improves the situation.

A vehicle seat is provided comprising at least one vibration device comprising an electroacoustic transducer, the vibration device having a mass less than or equal to 130 g.

With these arrangements, the mass of the vehicle seat comprising such a vibration device is reduced.

According to another aspect, the electroacoustic transducer comprises a permanent magnet, the permanent magnet being made of neodymium.

Such a permanent magnet has the advantage of being lightweight.

For example, the electroacoustic transducer comprises a coil, the permanent magnet being at least partially received inside the coil, the coil and the permanent magnet together producing a magnetic field greater than 2.5 T.

Such a magnetic field increases the excursion of the permanent magnet, thus generating more force to be transmitted to the occupant of the seat.

According to another aspect, a displacement of the permanent magnet due to the magnetic field produces a force greater than 3 N.

Such a force ensures that an occupant of the vehicle seat sufficiently perceives the vibrations produced by the vibration device.

According to another aspect, the electroacoustic transducer comprises a housing and a permanent magnet, the permanent magnet being movably connected to the housing by at least one suspension, the suspension having a stiffness greater than 5,000 N·m$^{-1}$.

In particular, the stiffness is greater than 9,000 N·m$^{-1}$.

A vibration device having a stiffness and mass as described above allows oscillation of the magnet in a low frequency range to ensure tactile stimulation of the seat occupant. Also, such stiffness of the suspension allows rapid excursion of the permanent magnet. This gives the user the sensation of a vigorous pulse.

In particular, the electroacoustic transducer has a resonant frequency of less than 50 Hz.

Such a resonant frequency of the vibration device makes it possible to produce vibrations over a bandwidth of between 20 Hz and 130 Hz. The term "bandwidth" is understood here to mean a frequency range for which the vibrations produce sufficient force to be perceived by the seat occupant.

According to another aspect, the vehicle seat as described above comprises a seating portion and a backrest, the vibration device being located in the seating portion or in the backrest.

The invention claimed is:

1. A vehicle seat comprising:
   at least one vibration device configured to provide a tactile stimulation to a seat occupant of the vehicle seat and comprising an electroacoustic transducer,
   wherein the vibration device has a mass less than or equal to 130 g,
   wherein the electroacoustic transducer comprises a housing and a permanent magnet, the permanent magnet being movably connected to the housing by at least one suspension, the suspension having a stiffness greater than 5,000 N·m$^{-1}$.

2. The vehicle seat of claim 1, wherein the stiffness is greater than 9,000 N·m$^{-1}$.

3. The vehicle seat of claim 1, wherein the electroacoustic transducer has a resonant frequency of less than 50 Hz.

4. A vehicle seat comprising:
   at least one vibration device configured to provide a tactile stimulation to a seat occupant of the vehicle seat and comprising an electroacoustic transducer,
   wherein the vibration device has a mass less than or equal to 130 g,
   wherein the electroacoustic transducer comprises a permanent magnet,
   wherein the permanent magnet is made of neodymium,
   wherein the electroacoustic transducer comprises a coil, the permanent magnet being at least partially received inside the coil, the coil and the permanent magnet together producing a magnetic field greater than 2.5 T.

5. The vehicle seat of claim 4, wherein a displacement of the permanent magnet due to the magnetic field produces a force greater than 3 N.

6. A vehicle seat comprising:
at least one vibration device configured to provide a tactile stimulation to a seat occupant of the vehicle seat and comprising an electroacoustic transducer,
wherein the vibration device has a mass less than or equal to 130 g,
wherein the electroacoustic transducer comprises a permanent magnet and a coil, the permanent magnet being at least partially received inside the coil and configured to move the permanent magnet relative to the coil to provide the tactile stimulation.

7. The vehicle seat of claim 6, wherein the electroacoustic transducer comprises a housing, the permanent magnet being movably connected to the housing by at least one suspension.

8. The vehicle seat of claim 6, further comprising a seating portion and a backrest, the vibration device being located in the seating portion or in the backrest, and wherein the electroacoustic transducer comprises a housing fixed to one of the seating portion or the backrest and the permanent magnet movably connected to the housing by at least one suspension.

9. The vehicle seat of claim 6, further comprising a seating portion and a backrest, the vibration device being located in the seating portion or in the backrest.

* * * * *